United States Patent [19]

Luenberger

[11] 3,995,505
[45] Dec. 7, 1976

[54] MEANS FOR AND METHOD OF VARIABLE DRIVE SPRING COMPENSATION

[75] Inventor: Frederick O. Luenberger, Stratford, Conn.

[73] Assignee: Emerson Electric Co., St. Louis, Mo.

[22] Filed: June 23, 1975

[21] Appl. No.: 589,040

[52] U.S. Cl. .................. 74/230.17 A; 74/230.17 E
[51] Int. Cl.[2] .................. F16H 55/52; F16H 55/56
[58] Field of Search ........... 74/230.17 E, 230.17 A, 74/230.17 R, 230.17 C, 230.17 B, 217 CV, 217 R, 192

[56] References Cited

UNITED STATES PATENTS

| | | | |
|---|---|---|---|
| 2,420,100 | 5/1947 | Salsbury | 74/230.17 E |
| 2,543,337 | 2/1951 | Salsbury | 74/230.17 E |
| 3,111,864 | 11/1963 | Christian | 74/230.17 A |
| 3,664,206 | 5/1972 | Clauss, Jr. | 74/230.17 E |
| 3,776,053 | 12/1973 | Segerstad | 74/230.17 E |

FOREIGN PATENTS OR APPLICATIONS

| | | | |
|---|---|---|---|
| 37,043 | 1/1927 | Denmark | 74/230.17 E |

*Primary Examiner*—Samuel Scott
*Assistant Examiner*—A. Russell Burke
*Attorney, Agent, or Firm*—Polster and Polster

[57] ABSTRACT

In a variable speed drive in which a driven pulley has at least one movable disc biased axially by means of a compression spring, a compensating device is provided including means for caging the ends of the spring, and centrifugally actuated means operably connected to the caging means to counteract a part of the axial bias of the spring when the disc is rotated.

7 Claims, 17 Drawing Figures

MEANS FOR AND METHOD OF VARIABLE DRIVE SPRING COMPENSATION

BACKGROUND OF THE INVENTION

In the conventional variable speed drive in which a drive pulley and a driven pulley are each made up of a disc fixed against axial movement on a shaft and a disc which is movable axially with respected to the fixed disc, on the same shaft, the driven pulley movable disc is biased axially toward the fixed disc by a compression spring. The drive pulley movable disc is forced toward the fixed drive pulley disc mechanically. A V-belt running between the drive pulley and the driven pulley is forced radially outwardly from the center of the drive pulley when the movable disc of the drive pulley is forced toward the fixed disc of the drive pulley, which in turn, pulls the belt in a direction away from the driven pulley, forcing the movable disc of the driven pulley away from its associated fixed disc, against the bias of the spring.

It can be seen that under these circumstances, the faster the driven pulley rotates, i.e., the closer to the center of the pulley the belt moves, the greater the axial thrust of the movable disc will be, as the compression spring is compressed to a greater degree.

This produces excessive wear, and has no corresponding advantage, because the operation of the device does not require greater axial pressure on the belt at the higher speed.

One of the objects of the invention is to provide means and method for relieving a portion of the excess axial thrust of the compression spring as the speed of the driven pulley is increased.

Another object is to provide such means and method which are simple, dependable and effective.

Other objects will become apparent to those skilled in the art in the light of the following description and accompanying drawings.

SUMMARY OF THE INVENTION

In a variable speed drive having a drive pulley and a driven pulley, both of said pulleys having at least one movable disc and the movable disc of the driven pulley being biased axially continuously toward a facing disc by a compression spring, a device for and method of reducing wear on the drive belt extending between the pulleys are provided in which the bias of the compression spring is counteracted as the driven pulley rotates faster, by a force increasing between limits with the speed of rotation of the pulley. The means by which this is accomplished include means for caging the ends of the spring and bendable means connecting the caging means and responsive to centrifugal force.

DESCRIPTION OF THE PREFERRED EMBODIMENT

Figure 1:
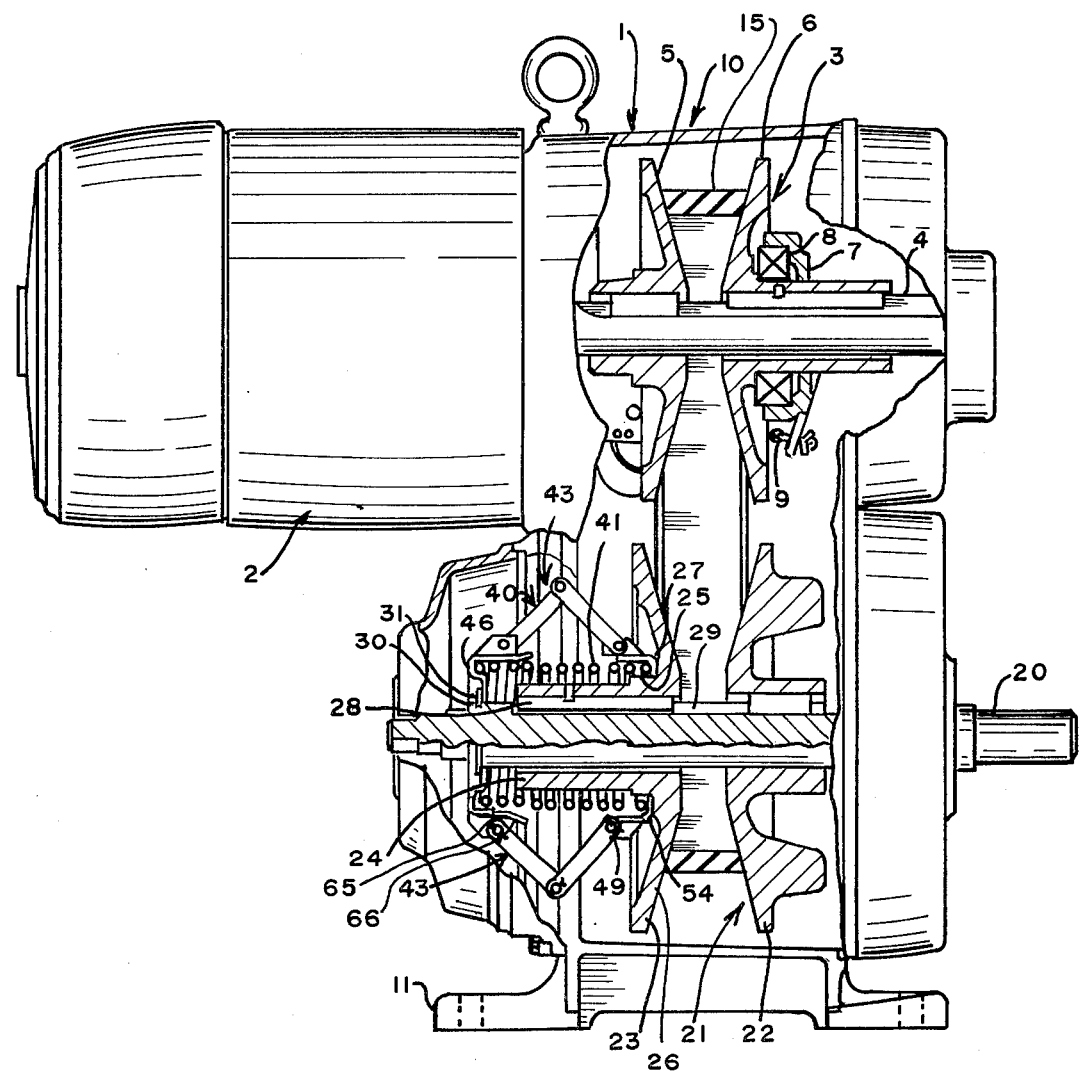
FIG. 1 is a view in side elevation, partly broken away and partly in section, of a variable speed drive equipped with one embodiment of compensator of this invention.

Referring now to FIG. 1 for one embodiment of this invention, reference numeral 1 indicates a variable speed drive of the type sold under the trademark VARIDRIVE by U.S. Electrical Motors Division of Emerson Electric Co. It includes a frame and housing 10, supported by a base 11, a drive motor 2, and a drive pulley 3 keyed to a drive shaft 4 rotated by the drive motor 2.

The drive pulley 3 is made up of a fixed disc 5, which is keyed to the shaft 4 for rotation therewith but is fixed against axial movement, and a movable disc 6, also keyed to the shaft for rotation therewith, but movable axially thereof. The movable disc 6 is shifted axially with respect to the fixed disc 5 by conventional shifting mechanism 7 which includes bearings 8 and a control chain 9 by which the disc 6 is forced mechanically toward the fixed disc. Mounted in bearings in the lower part of the housing 10, is a driven shaft 20, on which a driven pulley 21 is mounted. The driven pulley is made up of a fixed disc 22 and a movable disc 23. The fixed disc is mounted on the shaft 20 for rotation therewith and fixed against axial movement with respect to the shaft. The movable disc 23, which is also mounted on the shaft for rotation therewith, has a web 26 and an integral sleeve 24 with a stepped hub 25. The web 26 has a ground, tapered, belt-receiving surface on its inboard face, which is conventional, and a radially extending shoulder 27 on its outboard face adjacent the hub. A key 28 connected to the sleeve 24 by means of a set screw, slides in a keyway 29 in the shaft 20. The shaft 20 also has an annular channel 30 in which a retaining ring 31 is seated. A conventional speed drive cogged or ribbed V-belt 15 extends between and around the pulleys 3 and 21.

All of the elements described have been conventional and arranged in a conventional manner.

In the embodiment of this invention illustrated in FIG. 1, a compensator assembly 40 includes a conventional compression spring 41, caging members, which in the embodiment shown include an outboard cup 46 an inboard cup or collar 54, and compensator arms 43. The outboard cup 46 is mounted on the shaft 20 and is seated against the retaining ring 31. The inboard collar 54 is mounted on the hub 25 and is seated against the radial shoulder 27 of the movable disc 23.

Figure 4:
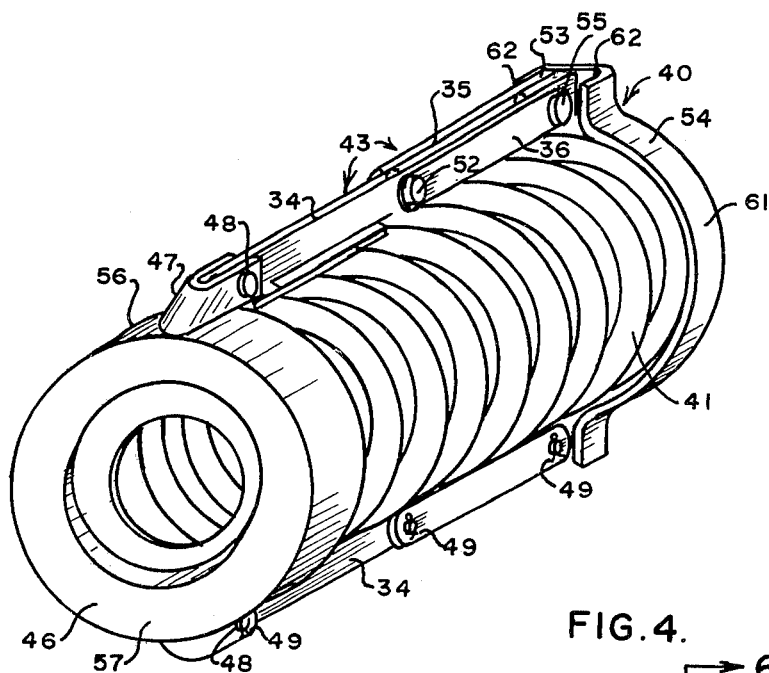
FIG. 4 is a view in perspective showing details of the compression spring and compensating mechanism of the device shown in FIG. 1.
Figure 6:
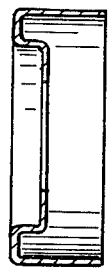
FIG. 6 is a sectional view taken along line 6—6 of FIG. 5.
Figure 5:
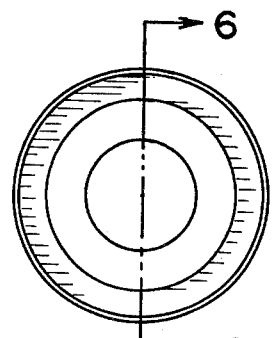
FIG. 5 is a view in end elevation of a cup constituting one of the caging members of the compensating device shown in FIG. 4.
Figure 14:
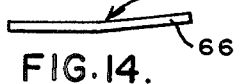
FIG. 14 is a view in edge elevation of the arm support shown in FIG. 13.
Figure 15:
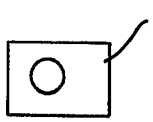
FIG. 15 is a view in side elevation of a connector ear part of the collar of FIG. 8.
Figure 16:
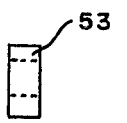
FIG. 16 is a view in end elevation of the ear shown in FIG. 15.

Referring now particularly to FIG. 4, outer cup 46 is provided with clevis yokes 47 welded to the outside surface of a side wall 56 of the cup, diametrically opposite one another. The free ends of legs of the clevis yokes project in an axial direction beyond the inboard edge of the side wall 56. An arm support or lifter 65 is welded to the underside of the legs of the yoke 47. The lifter 65 has a part 66 which is bent in a direction radially outwardly from the cup, as shown particularly in FIGS. 1 and 14. The side wall 46 contains one end of the spring 41, an axial end of which butts against the inside surface of a bottom wall 57. The bottom wall 57 has an opening in it to accommodate the shaft 20.

Figures 7, 8:
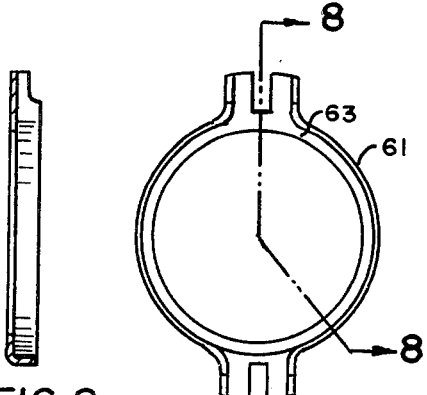
FIG. 7 is a view in front elevation of a collarcup constituting another caging member.
FIG. 8 is a sectional view taken along the line 8—8 of FIG. 7.
Figure 9:
FIG. 9 is a view in side elevation of a clevis yoke part of the cup shown in FIG. 5.
Figure 10:
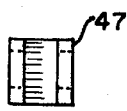
FIG. 10 is a view in front elevation of the clevis yoke of FIG. 9.
Figure 11:
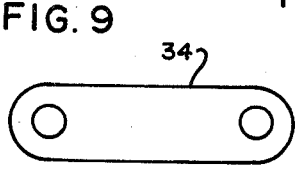
FIG. 11 is a view in side elevation of a compensator arm link.
Figure 12:
FIG. 12 is a plan view of the link shown in FIG. 11.
Figure 13:
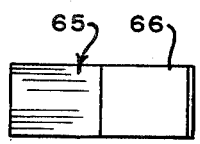
FIG. 13 is a top plan view of an arm support.

The inboard collar 54 has a side wall 61 parts of which are formed with wings 62 to form channels at diametrically opposite sides of the collar, and a bottom wall 63 against which the other axial end of the compression spring 41 butts, and which forms the bottom of the channel the sides of which are defined by the wings 62. In the embodiment shown, the bottom wall 63 within the channels is slotted as shown particularly in FIG. 7, and an ear 53 is seated in each slot and welded to the wall to form a one-piece unit.

Compensator arms 43 consist, in this embodiment, of identical links 34, 35 and 36. A link 34 is pivoted at one end to each of the clevis yokes 47 by means of a clevis pin 48 with a head at one end and a cotter pin 49 through a diametric hole at the other, to hold the pin in place in holes provided for the purpose in the yoke and link. At its other end, the link 34 is pivoted to a pair of links 35 and 36 by means of a pivot pin 52. At their other ends, the links 35 and 36, which straddle the ear 53 as they straddle the link 34, are pivoted to the ear 53 by means of a connector pin 55.

It will be seen that the compensator assembly is an unitary assembly in the sense that it can be assembled and simply be slid onto the sleeve and shaft, before the retaining ring 31 is in place and the drive belt is installed, and the retaining ring 31 snapped into its groove. When the drive is being dismantled, the caging of the compression spring, which is a powerful spring, also helps insure that the spring does not fly from the shaft when the retaining ring 31 is removed.

The arms 43 are kept arched slightly in a direction away from the spring by the lifter 65. When the drive is running, and the driven pulley is rotating relatively slowly, the arms exert little influence on the spring. However, as the ratio of the effective diameter of the drive pulley to that of the driven pulley increases, so that the driven pulley rotates faster, the effect of centrifugal force increases steadily. The movement of the belt toward the center of the driven pulley and centrifugal force cause the compensator arms to move from the position shown in FIG. 4 to that shown in FIG. 1. The weight and configuration of the compensator arms are such that the effect of the centrifugal force never exceeds the compressive force of the spring 41, and, in fact, the arms are so arranged as to exert a counterforce equal to or only slightly more or slightly less than the increased compressive force of the spring as the spring is compressed from its most extended operative condition to its most compressed operative condition. This is illustrated by the graph shown in FIG. 17, which represents actual operation of the compensator.

Figure 17:
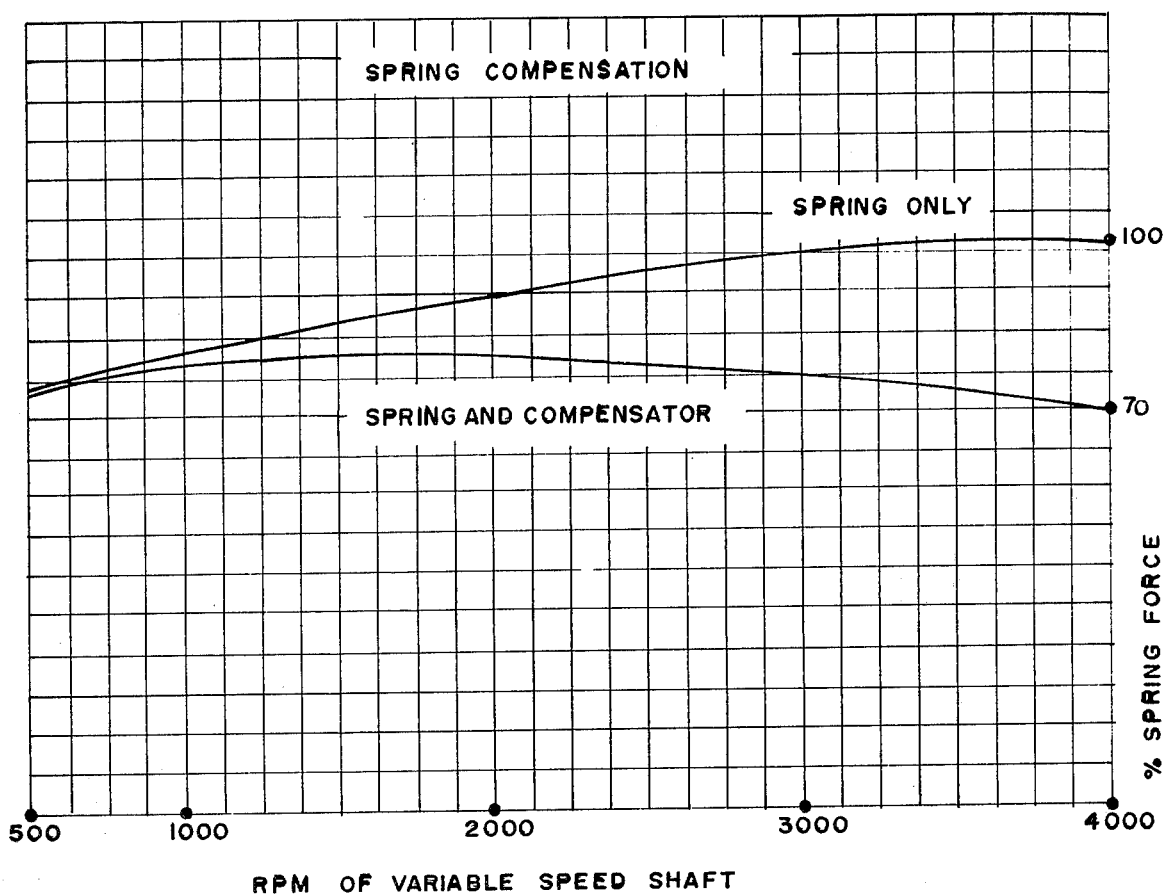
FIG. 17 is a graph illustrating the operation of one embodiment of compensator of this invention.

Merely by way of illustration, with a compression spring 2½ inches in internal diameter, with 8½ active turns and 10½ total turns, a free length of 8.3 inches, a spring rate of 35 pounds per inch and a load of 159 pounds at a 3¾ inches length, steel compensator links 1.875 inches long, 0.500 inch wide, 0.1046 inch thick, with center-to-center distance of 1.375 inches between pivot holes, and with steel pivot pins with a shank 0.186 inch in diameter, a head 5/16 inch in diameter and 1/16 inch thick, a 5/64 inch cotter pin hole in the shank and the shank 19/32 inch long from the inside edge of the head to the free end, will provide compensation in a pattern substantially shown in FIG. 17, when used with a pulley 21 approximately 10 inches in diameter and a belt approximately 2 inches wide and ½ inch thick.

Figure 3:
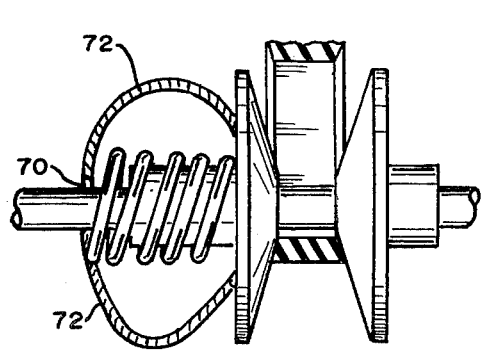
FIG. 3 is a view of the device shown in FIG. 2 in the condition of rotation at a higher speed.
Figure 2:
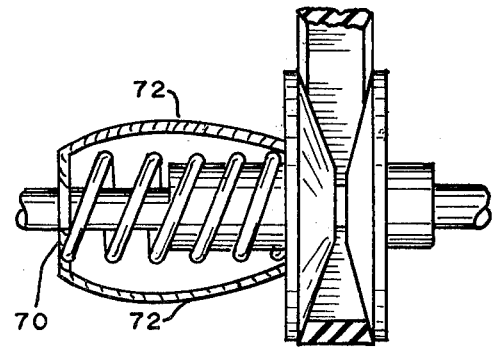
FIG. 2 is a view in side elevation, partly in section, of a driven pulley part of a variable speed drive, showing another embodiment of compensator of this invention, with the pulley being driven at a low speed.

A somewhat simpler arrangement is shown in FIGS. 2 and 3, where a disc 70 is substituted for the outboard cup 46, and a pair of cable members 72 take the place of the compensator arms 43. The principle of operation of this embodiment is the same.

It is of course necessary that some radially outboard movement be produced, to accomplish the counteraction of the spring force. To this end, the compensating elements connecting the means by which the spring is caged have either to be flexible or articulated. The term "bendable" has been used in the claims to encompass both.

Numerous variations in the construction of the compensator of this invention, within the scope of the appended claims, will occur to those skilled in the art in the light of the foregoing disclosure. For example, the links of the embodiment shown in FIGS. 1 and 4 can be made of different lengths, widths, thickness and shapes. Two "single " links, connected by a clevis type arrangement or the like, can be used. In either embodiment, more than two compensating arm assemblies or cables can be used, arranged symmetrically with respect to the axis of rotation. The types of cups, collars or discs constituting the caging means, and the means of connection of the links or cables to them can be varied. One of the cage members can be fixed against axial movement. These variations are merely illustrative.

Having thus described the invention, what is claimed and desired to be secured by Letters Patent is :

1. In a variable speed drive having a drive pulley and a driven pulley, both of said pulleys having at least one movable disc and the driven one having a movable disc mounted on a shaft and axially biased continuously toward another facing disc by a compression spring mounted on and around said shaft, the improvement comprising means for caging the ends of said spring, said caging means comprising annular cups, one at either end of said spring, and centrifugally actuated means operatively connected to said caging means for counteracting a part of the axial bias of said spring when said shaft and disc are rotated, said centrifugally actuated means comprising elongate two-ended bendable members connected at opposite ends to said cups, whereby the axially biased spring force is reduced with increasing speed of rotation, without affecting the speed of rotation of said driven pulley with respect to said drive pulley.

2. The improvement of claim 1 wherein the bendable members comprise links articulated between the said cups and pivotally mounted on said cups.

3. The improvement of claim 2 wherein a plurality of sets of said links is provided, spaced symmetrically about the axis of rotation of said shaft, each of said sets being composed of three links, one of said links being pivotally mounted on one of said cups and a pair of said links being pivotally connected at one of their ends to and straddling said first link and being pivotally mounted at their other ends to the other of said cups.

4. The improvement of claim 3 wherein the first said link is pivoted in and to a clevis yoke on the outside of said cup, and the links of the pair of links are pivoted to an ear on the second cup.

5. The improvement of claim 2 wherein a link lifter is mounted on one of said cups beneath at least one of said links to limit its movement toward said spring to ensure that the said links are always arched between said cups in a direction away from said spring.

6. A method of reducing wear on a drive belt of a variable speed drive having a drive pulley and a driven pulley, both of which have at least one movable disc at least one of which is spring biased continuously toward a facing disc and said drive belt being mounted on and extending between said pulleys to transmit power therebetween, said method comprising counteracting said axial biasing force by a countervailing force increasing between limits with the speed of rotation of the disc upon which said axial biasing force is exerted, said countervailing force being always substantially less than the said axial force between said limits whereby the axially biased spring force is reduced with increasing speed of rotation, without affecting the speed of rotation of said driven pulley with respect to said drive pulley.

7. In a variable speed drive having a drive pulley and a driven pulley, both of said pulleys having at least one movable disc and the driven one having a movable disc mounted on a shaft and axially biased continuously toward another facing disc by a compression spring mounted on and around said shaft, the bias of said compression spring increasing as said spring is compressed, the improvement comprising means for caging the ends of said spring, and centrifugally actuated means operatively connected to said caging means for counteracting at least a part of said increasing axial bias of said spring when said shaft and disc are rotated, without changing the relative spacing of said movable disc and said fixed disc.

* * * * *

UNITED STATES PATENT AND TRADEMARK OFFICE
CERTIFICATE OF CORRECTION

PATENT NO. : 3,995,505
DATED : December 7, 1976
INVENTOR(S) : Frederick O. Luenberger It is certified that error appears in the above-identified patent and that said Letters Patent are hereby corrected as shown below:

Column 1, line 9, "respected" should be "respect".

Column 2, line 60, "conventional speed" should be "conventional variable speed"

Signed and Sealed this

Fifteenth Day of March 1977

[SEAL]

Attest:

RUTH C. MASON
Attesting Officer

C. MARSHALL DANN
Commissioner of Patents and Trademarks